US012378811B1

(12) United States Patent
Chavez

(10) Patent No.: US 12,378,811 B1
(45) **Date of Patent: *Aug. 5, 2025**

(54) JAMB-HUNG SECONDARY DOOR AND METHOD OF INSTALLATION

(71) Applicant: Unique Home Designs, Inc., Gilbert, AZ (US)

(72) Inventor: Lawrence Robert Chavez, Gilbert, AZ (US)

(73) Assignee: Unique Home Designs, Inc., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,786

(22) Filed: Jun. 4, 2024

Related U.S. Application Data

(63) Continuation of application No. 18/199,352, filed on May 18, 2023, now Pat. No. 12,000,201, which is a continuation of application No. 17/958,999, filed on Oct. 3, 2022, now Pat. No. 11,655,665, which is a continuation of application No. 17/111,986, filed on Dec. 4, 2020, now Pat. No. 11,480,007.

(60) Provisional application No. 62/943,686, filed on Dec. 4, 2019.

(51) Int. Cl.

| | |
|---|---|
| ***E06B 1/60*** | (2006.01) |
| ***E06B 1/12*** | (2006.01) |
| ***E06B 1/52*** | (2006.01) |
| ***E06B 5/00*** | (2006.01) |

(52) U.S. Cl.
CPC .............. *E06B 1/6015* (2013.01); *E06B 1/12* (2013.01); *E06B 1/52* (2013.01); *E06B 5/003* (2013.01)

(58) Field of Classification Search
CPC ..... E06B 1/12; E06B 1/32; E06B 1/52; E06B 1/60; E06B 1/6015; E06B 5/003; E06B 5/04; E06B 5/06
See application file for complete search history.

(56) References Cited

U.S. PATENT DOCUMENTS 3,164,228 A 1/1965 Segre
4,302,907 A * 12/1981 Canals ...................... E06B 5/11 49/67
4,531,337 A * 7/1985 Holdiman ............. E06B 1/6015 49/505
6,185,881 B1 * 2/2001 Olberding ........... E05B 15/0205 52/656.6

(Continued)

*Primary Examiner* — Christine T Cajilig
(74) *Attorney, Agent, or Firm* — Booth Udall, PLC; Kenneth C. Booth

(57) ABSTRACT

A method of installing a combination door unit into a threshold of a house, comprising placing a combination door unit within a threshold opening of a house surrounded by a plurality of house frame studs. The combination door unit comprises a door frame, a threshold door hingedly coupled to the door frame, and a secondary door. The secondary door is hingedly coupled to a mounting frame and the mounting frame, the door frame, and the plurality of house frame studs are aligned when the combination door unit is placed within the threshold opening. The method of installing the combination door unit may also comprise the steps of leveling the combination door unit, removing the secondary door from the combination door unit, driving a plurality of fasteners through the mounting frame, through the door frame, and into the house frame studs, and replacing the secondary door on the combination door unit.

20 Claims, 17 Drawing Sheets

(56) References Cited

U.S. PATENT DOCUMENTS

| | | | | |
|---|---|---|---|---|
| 6,651,390 | B2 | 11/2003 | Camperelli | |
| 6,941,997 | B2 * | 9/2005 | Butler | E06B 5/003 160/92 |
| 8,850,744 | B2 | 10/2014 | Bauman | |
| 8,887,457 | B1 | 11/2014 | Knight | |
| 9,316,041 | B2 | 4/2016 | Olson | |
| 10,808,438 | B2 * | 10/2020 | Takase | E05C 7/02 |
| 2002/0174612 | A1 * | 11/2002 | Camperelli | E06B 1/6092 52/210 |
| 2004/0173324 | A1 * | 9/2004 | Butler | E05D 3/04 160/92 |
| 2014/0026489 | A1 * | 1/2014 | Bauman | E05C 9/1875 292/145 |
| 2014/0338275 | A1 * | 11/2014 | Knight | E06B 5/11 52/210 |
| 2015/0082702 | A1 * | 3/2015 | Walter | E06B 9/04 49/56 |
| 2016/0053527 | A1 * | 2/2016 | Olson | E06B 1/70 49/471 |
| 2021/0355743 | A1 | 11/2021 | Dixon | |

* cited by examiner

JAMB-HUNG SECONDARY DOOR AND METHOD OF INSTALLATION

CROSS REFERENCE TO RELATED APPLICATIONS

This application is a continuation application of U.S. patent application Ser. No. 18/199,352 entitled "JAMB-HUNG SECONDARY DOOR AND METHOD OF INSTALLATION" to Chavez that was filed on May 18, 2023, which is a continuation application of U.S. patent application Ser. No. 17/958,999 entitled "JAMB-HUNG SECONDARY DOOR AND METHOD OF INSTALLATION" to Chavez that was filed on Oct. 3, 2022, which is a continuation application of U.S. patent application Ser. No. 17/111,986 entitled "JAMB-HUNG SECONDARY DOOR AND METHOD OF INSTALLATION" to Chavez that was filed on Dec. 4, 2020, which claims the benefit of the filing date of U.S. Provisional Patent Application No. 62/943,686 entitled "JAMB-HUNG SECURITY DOOR AND METHOD OF INSTALLATION" to Chavez that was filed on Dec. 4, 2019, the disclosures of each of which are hereby incorporated herein by this reference.

TECHNICAL FIELD

Aspects of this document relate generally to secondary doors, and more specifically to secondary doors configured to directly couple to the house frame.

BACKGROUND

Homeowners commonly elect to have two doors installed in any given doorway, with one door being the threshold door and the other door being a secondary door designed to increase airflow or visibility through the doorway. Typically, the secondary door is attached to the door frame of the threshold door using fasteners that are accessible from outside the secondary door. This makes the secondary door removable from outside the secondary door, even when it is closed and locked. What is needed is a secondary door with increased security that cannot be removed when the secondary door is closed and locked.

SUMMARY

Aspects of this document relate to a method of installing a combination door unit into a threshold of a house, the method comprising placing a combination door unit within a threshold opening of a house, wherein the combination door unit fills the threshold opening and comprises a door frame having a head and two jambs, a threshold door hingedly coupled to a first jamb of the two jambs, and a secondary door having a mounting frame, wherein the secondary door is hingedly coupled to the mounting frame through a plurality of slip hinges each having a base and a tube, and the mounting frame is coupled to the door frame by a first plurality of fasteners, wherein the threshold opening is surrounded by a plurality of house frame studs, and, when the combination door unit is placed within the threshold opening, the mounting frame, the door frame, and the plurality of house frame studs are aligned, leveling the combination door unit, wherein the step of leveling the combination door unit comprises the step of inserting a plurality of shims between the plurality of house frame studs and the combination door unit, removing the secondary door from the combination door unit, wherein the step of removing the secondary door comprises the step of lifting each tube of the plurality of slip hinges off of a corresponding base of the plurality of slip hinges, driving a second plurality of fasteners through the mounting frame, through the door frame, and into the house frame studs, wherein each of the second plurality of fasteners is longer than each of the first plurality of fasteners, is driven spaced apart from each adjacent fastener of the second plurality of fasteners around the perimeter of the combination door unit, and is driven into one of the house frame studs to a depth of at least ½ inch, and replacing the secondary door on the combination door unit, wherein the step of replacing the secondary door comprises the step of placing each tube of the plurality of slip hinges onto the corresponding base of the plurality of slip hinges.

Particular embodiments may comprise one or more of the following features. The mounting frame may have at least three sides each comprising a mounting flange, wherein the mounting flanges are configured to overlap with the corresponding head and two jambs of the door frame, the step of driving the second plurality of fasteners through the mounting frame comprising the step of driving the second plurality of fasteners through the mounting flanges of the mounting frame. The mounting frame may be formed of metal. The step of driving the second plurality of fasteners may comprise the steps of driving a first portion of the second plurality of fasteners through the first jamb, driving a second portion of the second plurality of fasteners through a second jamb of the two jambs, and driving a third portion of the second plurality of fasteners through the head of the door frame.

Aspects of this document relate to a method of installing a combination door unit into a threshold of a house, the method comprising placing a combination door unit within a threshold opening of a house, wherein the threshold opening is surrounded by a plurality of house frame studs, the combination door unit comprising a door frame having a head and two jambs, a threshold door hingedly coupled to a first jamb of the two jambs, and a secondary door having a mounting frame, wherein the secondary door is hingedly coupled to the mounting frame, and the mounting frame is coupled to the door frame by a first plurality of fasteners, wherein, when the combination door unit is placed within the threshold opening, the mounting frame, the door frame, and the plurality of house frame studs are aligned, leveling the combination door unit, and driving a second plurality of fasteners through the mounting frame, through the door frame, and into the house frame studs, wherein each of the second plurality of fasteners is driven into one of the house frame studs to a depth of at least ½ inch.

Particular embodiments may comprise one or more of the following features. The secondary door may be coupled to the mounting frame through a plurality of slip hinges. The step of leveling the combination door unit may comprise the step of inserting a plurality of shims between the plurality of house frame studs and the combination door unit. The method may further comprise removing the secondary door from the combination door unit prior to driving the second plurality of fasteners and replacing the secondary door on the combination door unit after the step of driving the second plurality of fasteners. The step of driving the second plurality of fasteners may comprise the step of spacing apart the second plurality of fasteners around the perimeter of the combination door unit. The mounting frame may have at least three sides each comprising a mounting flange, wherein the mounting flanges are configured to overlap with the corresponding head and two jambs of the door frame, and the step of driving the second plurality of fasteners through the mounting frame may comprise the step of driving the second plurality of fasteners through the mounting flanges of the mounting frame. The step of driving the second plurality of fasteners may comprise the steps of driving a first portion of the second plurality of fasteners through the first jamb, driving a second portion of the second plurality of fasteners through a second jamb of the two jambs, and driving a third portion of the second plurality of fasteners through the head of the door frame.

Aspects of this document relate to a method of installing a combination door unit into a frame of a house, the method comprising placing a combination door unit within a threshold opening of a house, wherein the threshold opening is surrounded by a plurality of house frame studs, the combination door unit comprising a door frame, a threshold door hingedly coupled to the door frame, and a secondary door coupled to the door frame through a mounting frame, wherein, when the combination door unit is placed within the threshold opening, the mounting frame, the door frame, and the plurality of house frame studs are aligned, and driving a second plurality of fasteners through the mounting frame, through the door frame, and into the house frame studs, wherein each of the second plurality of fasteners extends into one of the house frame studs.

Particular embodiments may comprise one or more of the following features. The secondary door may be coupled to the mounting frame through a plurality of slip hinges. The method may further comprise the step of leveling the combination door unit, wherein the step of leveling the combination door unit comprises the step of inserting a plurality of shims between the plurality of house frame studs and the combination door unit. The method may further comprise removing the secondary door from the combination door unit prior to driving the second plurality of fasteners and replacing the secondary door on the combination door unit, after the step of driving the second plurality of fasteners. The step of driving the second plurality of fasteners may comprise the step of spacing apart the second plurality of fasteners around the perimeter of the combination door unit. The mounting frame may have at least three sides each comprising a mounting flange, wherein the mounting flanges are configured to overlap with the door frame, and the step of driving the second plurality of fasteners through the mounting frame may comprise the step of driving the second plurality of fasteners through the mounting flanges of the mounting frame. The combination door unit may further comprise a multi-point lock system having a central throw and at least two hooks operatively coupled to a key hole within the secondary door, wherein when the key hole is in a locked position, the central throw and the at least two hooks extend out of the secondary door, and when the key hole is in an unlocked position, the central throw and the at least two hooks are retracted into the secondary door. The step of driving the second plurality of fasteners may comprise the steps of driving a first portion of the second plurality of fasteners through a first jamb of the door frame, driving a second portion of the second plurality of fasteners through a second jamb of the door frame, and driving a third portion of the second plurality of fasteners through a head of the door frame. The mounting frame may be coupled to the door frame by a first plurality of fasteners.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
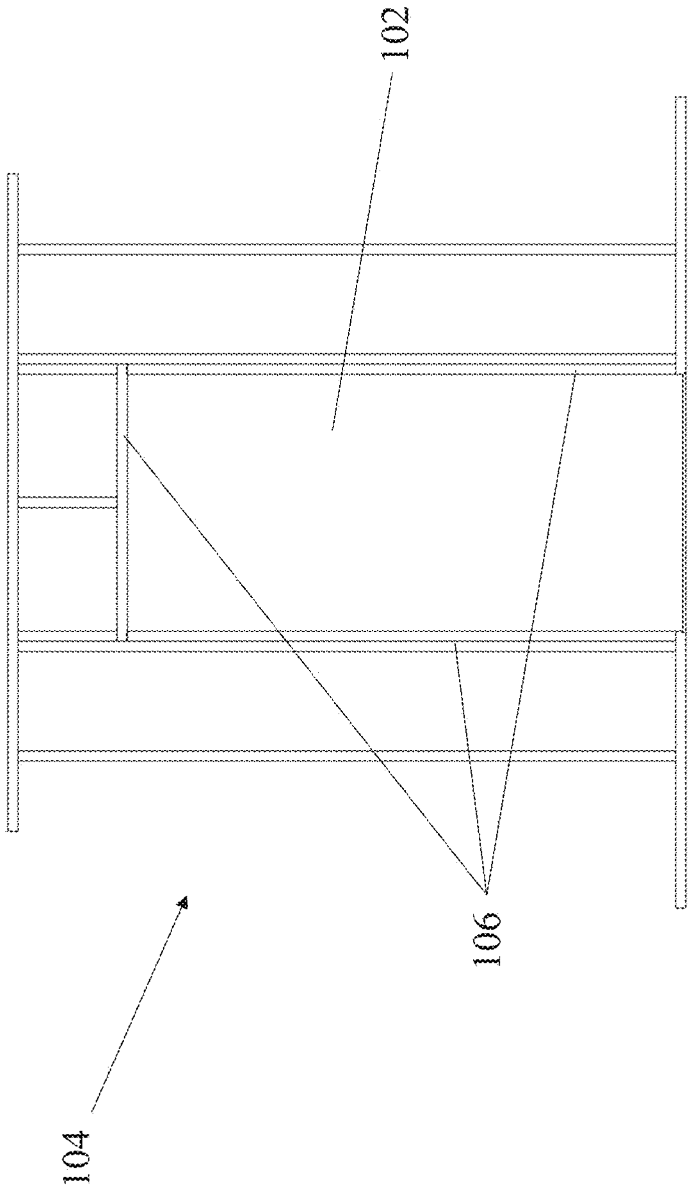
FIG. 1 is a front view of a threshold opening.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure discusses a combination door unit 100 configured to be installed within a threshold opening 102 of a frame 104 of a house (not shown). The threshold opening 102 within the frame 104 is illustrated in FIG. 1. As shown, the threshold opening 102 is typically surrounded by a plurality of house frame studs 106, which help to hold the combination door unit 100 in place once installed.

Figure 2:
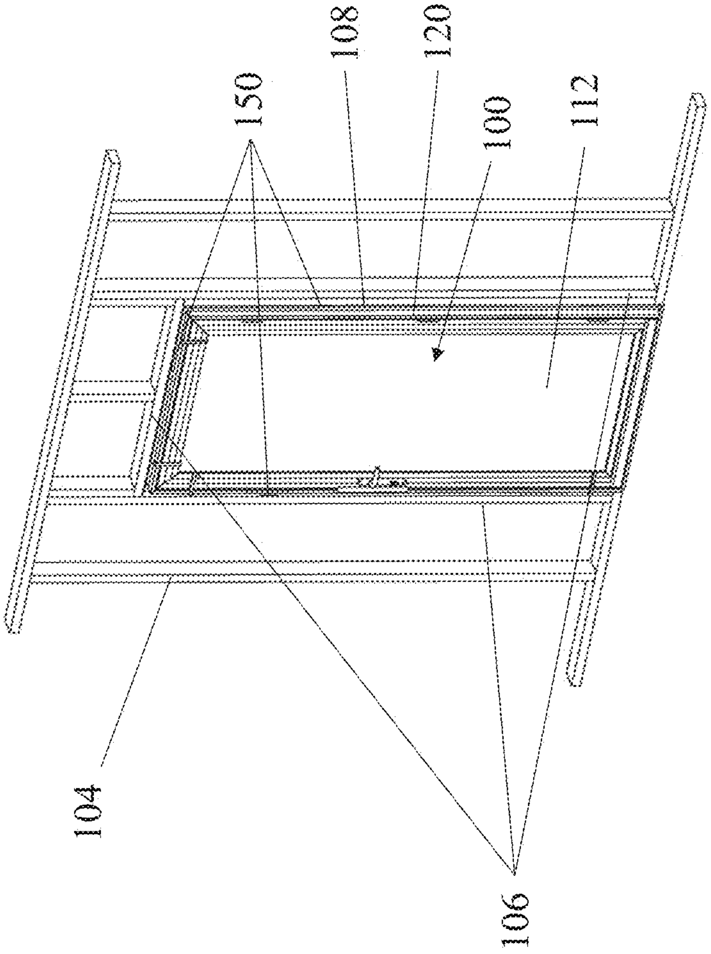
FIG. 2 is a perspective view of a combination door unit installed within the threshold opening shown in FIG. 1.
Figure 3:
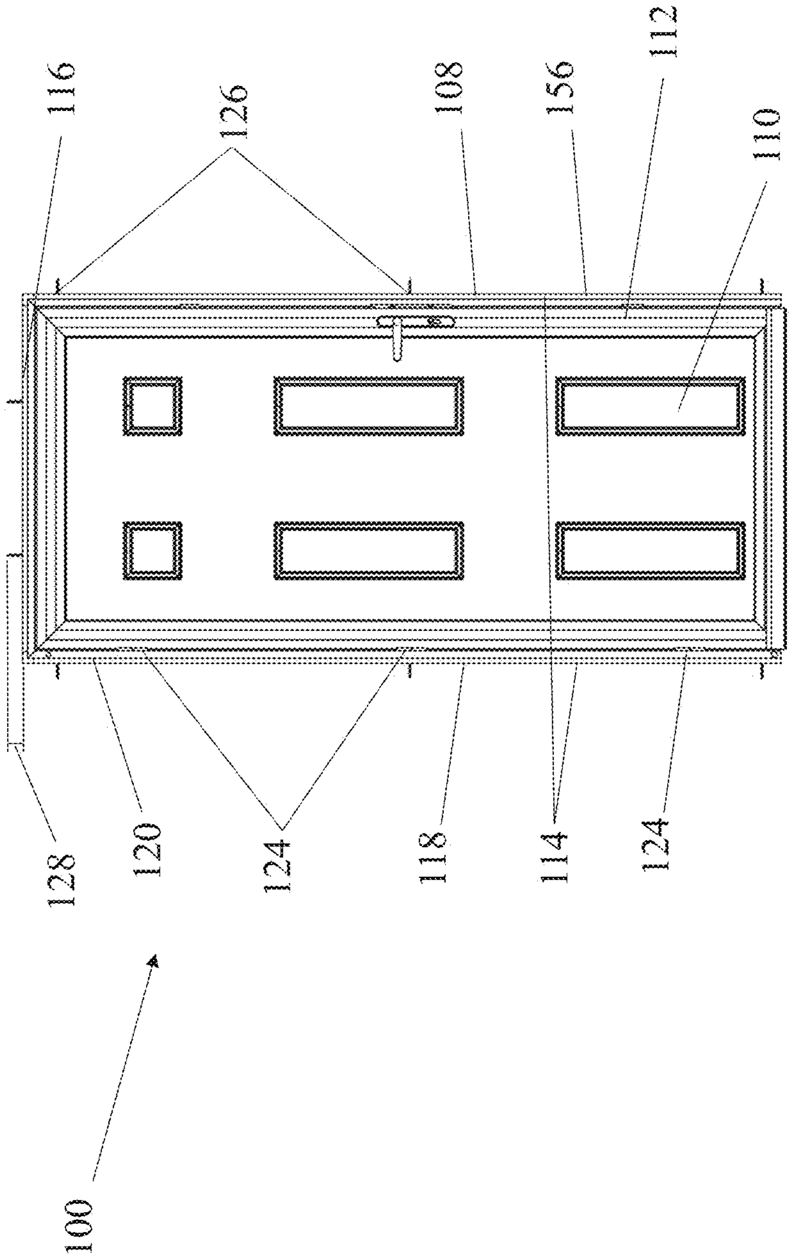
FIG. 3 is a front view of a combination door unit.
Figure 4:
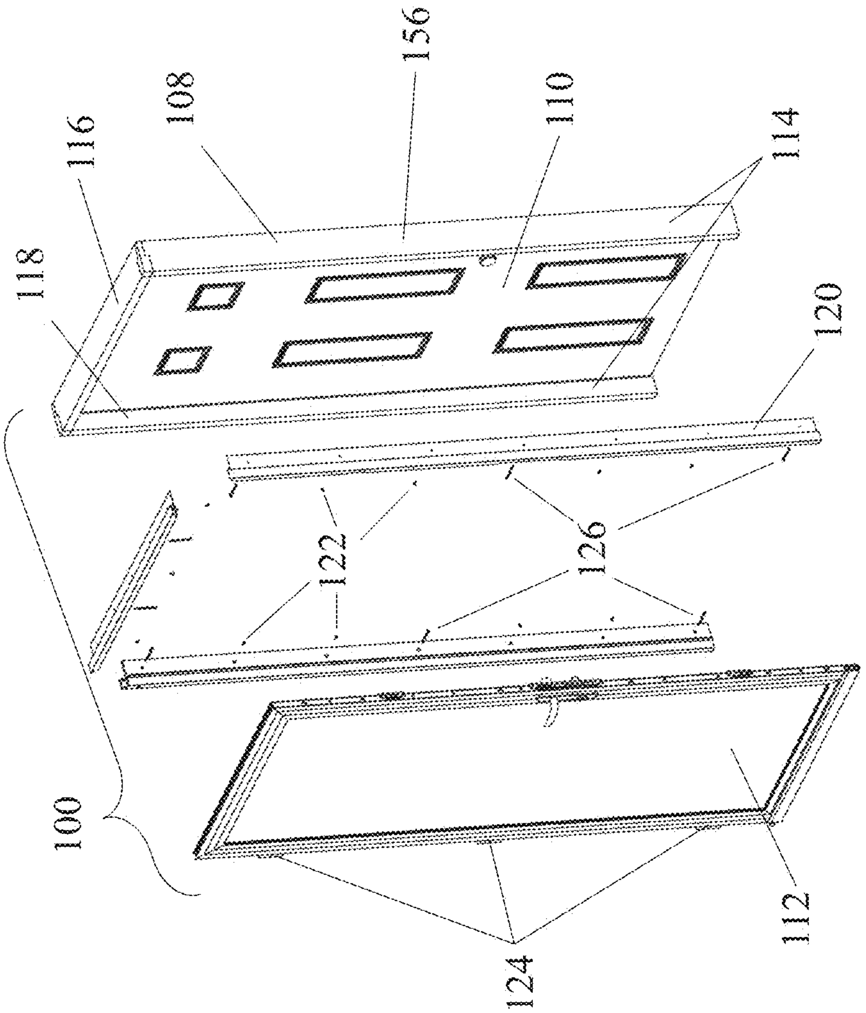
FIG. 4 is an exploded view of the combination door unit shown in FIG. 3.
Figure 5:
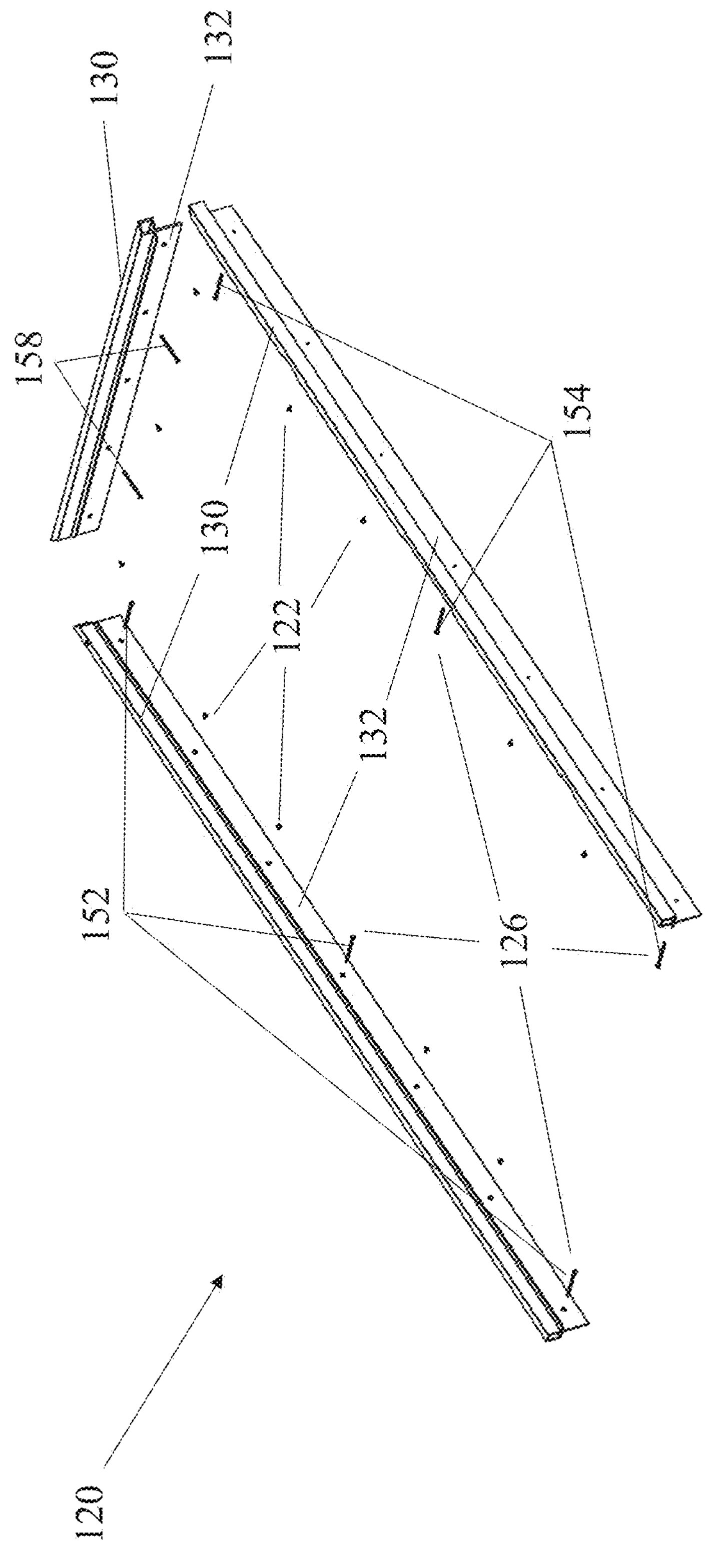
FIG. 5 is an exploded view of the mounting frame of the combination door unit shown in FIG. 3.

FIG. 2 illustrates one embodiment of the combination door unit 100 within the threshold opening 102. The combination door unit 100 may fill the threshold opening 102. FIGS. 3-5 illustrate an embodiment of the combination door unit 100. The combination door unit 100 may comprise a door frame 108, a threshold door 110, and a secondary door 112. In some embodiments, the door frame 108 and the threshold door 110 may already be installed within the threshold opening 102. In such an embodiment, the combination door unit 100 comprises the secondary door 112. The door frame 108 has two parallel jambs 114 joined at the top by a head 116. The threshold door 110 may be hingedly coupled to a first jamb 118 of the two jambs 114.

The secondary door 112 has a mounting frame 120. In some embodiments, the mounting frame 120 is formed of metal. In a particular embodiment, the mounting frame 120 is formed of aluminum. The mounting frame 120 may be coupled to the door frame by a first plurality of fasteners 122, such as screws or nails. A plurality of slip hinges 124 may couple the secondary door 112 to the mounting frame 120. Referring back to FIG. 2, when the combination door unit 100 is placed within the threshold opening 102, the mounting frame 120, the door frame 108, and the plurality of house frame studs 106 are aligned. Returning to FIGS. 3-5, once the combination door unit 100 is completely installed within the threshold opening 102, a second plurality of fasteners 126, such as screws or nails, extends through the mounting frame 120, through the door frame 108, and into the plurality of house frame studs 106. The second plurality of fasteners 126 are generally longer, individually, than the individual fasteners of the first plurality of fasteners 122. In addition, each of the second plurality of fasteners

126 is spaced apart from each adjacent fastener 126 around the perimeter of the combination door unit 100, and each of the second plurality of fasteners 126 extends into the house frame studs 106 to a depth 128 (see FIG. 3). The depth 128 may be at least ¼ inch, at least ½ inch, at least 1 inch, or at least 1.5 inches. Alternatively, the second plurality of fasteners 126 may extend all the way through the house frame studs 106.

Figure 6A:
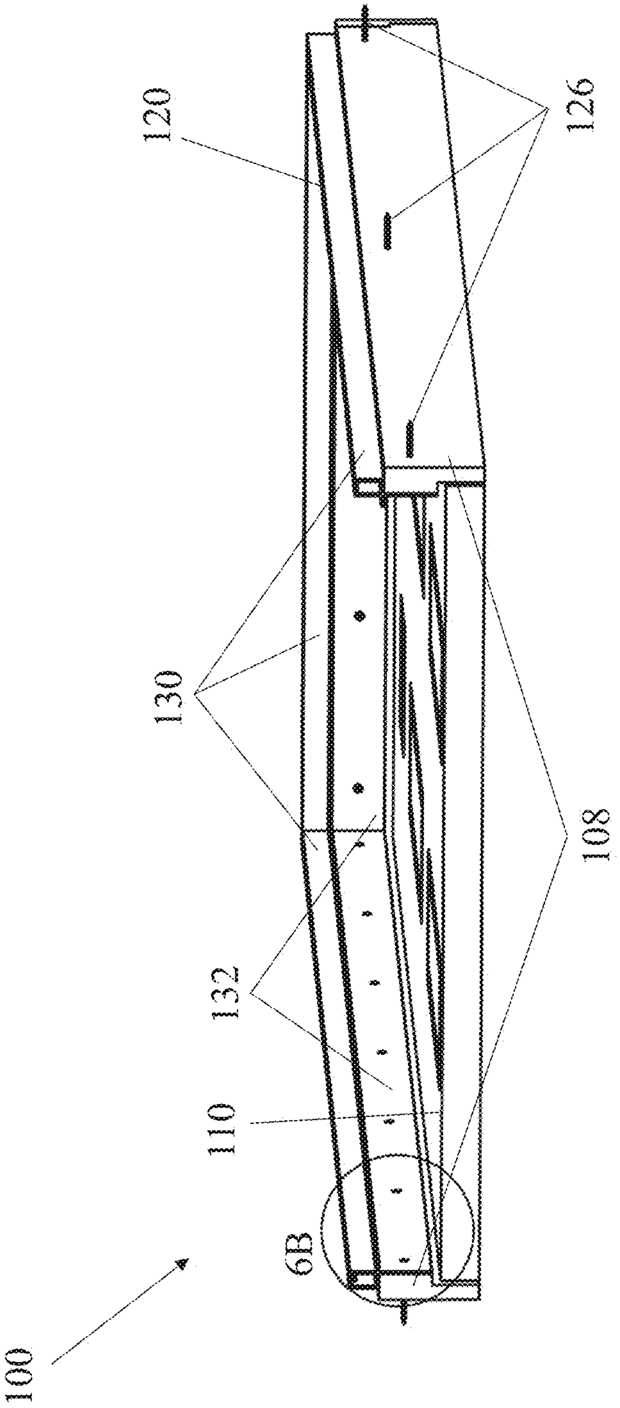
FIG. 6A is a bottom view of the combination door unit shown in FIG. 3 without the secondary door.
Figure 6B:
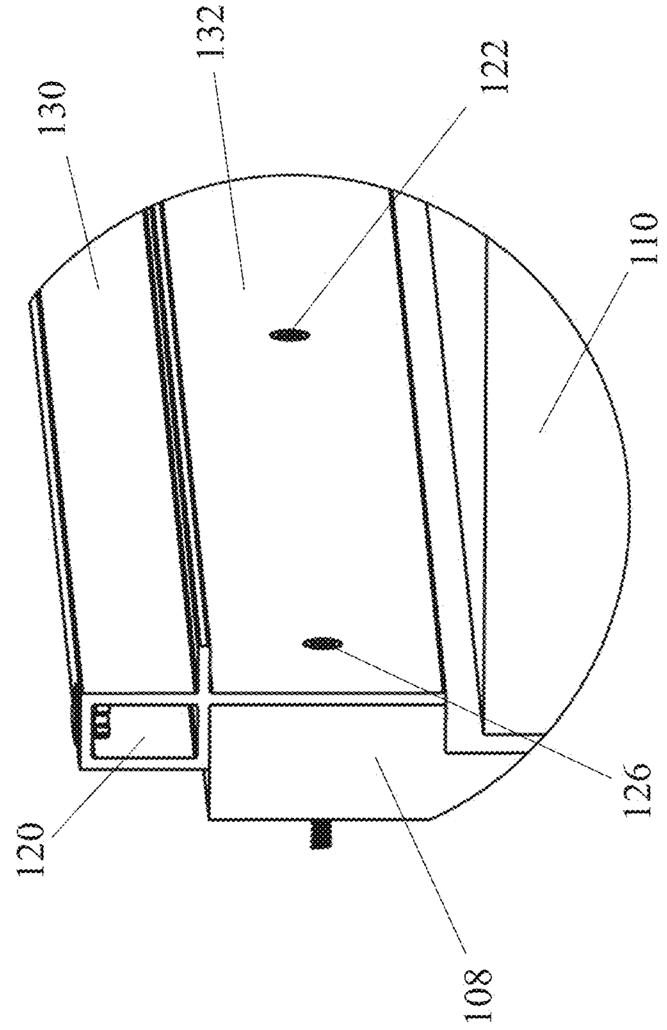
FIG. 6B is a close-up view taken from circle 6B in FIG. 6A.

Referring specifically to FIG. 5, the mounting frame 120 may have at least three sides 130. Each side 130 may have a mounting flange 132. The mounting flange 132 is a thin extension from the mounting frame 120 and is configured to overlap with the corresponding head 116 and two jambs 114 of the door frame 108 (see FIG. 6B). In embodiments having mounting flanges 132, the second plurality of fasteners 126 extends through the mounting flanges 132 to extend through the door frame 108 and into the plurality of house frame studs 106. In addition, the first plurality of fasteners 122 extends through the mounting flanges 132 to couple the mounting frame 120 to the door frame 108. FIGS. 6A-6B further illustrate the mounting flange 132 overlapping with the door frame 108.

Figure 7A:
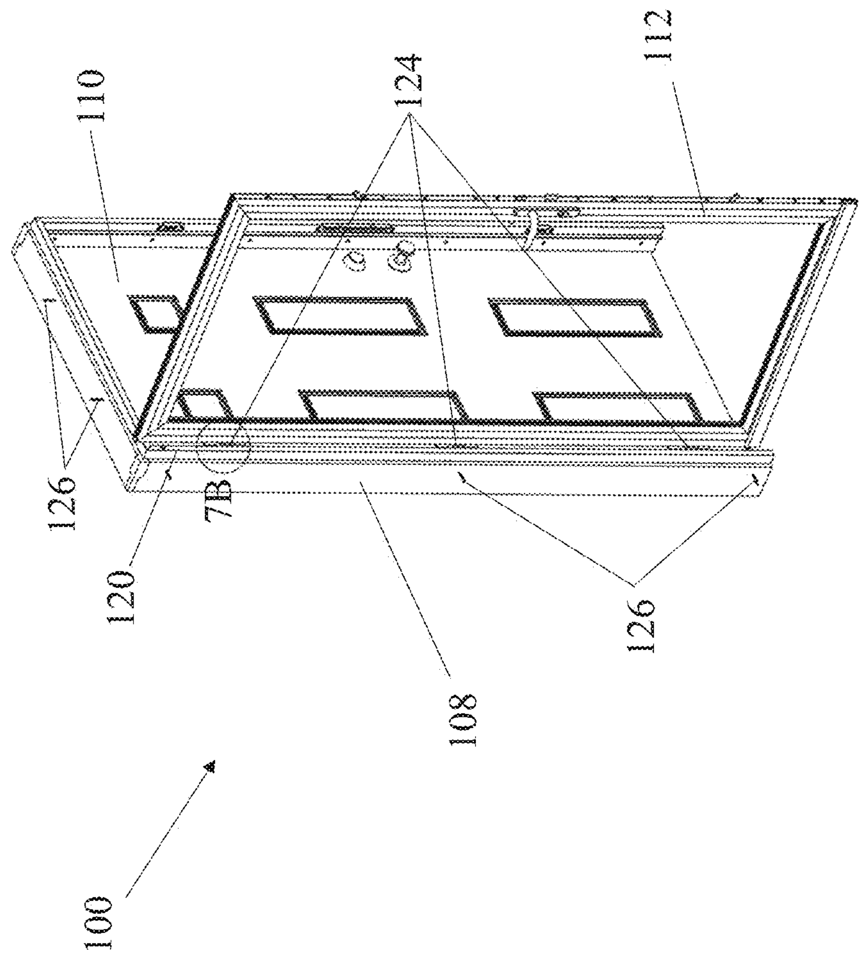
FIG. 7A is a perspective view of the combination door unit shown in FIG. 3 with the secondary door lifted off of the slip hinges.
Figure 7B:
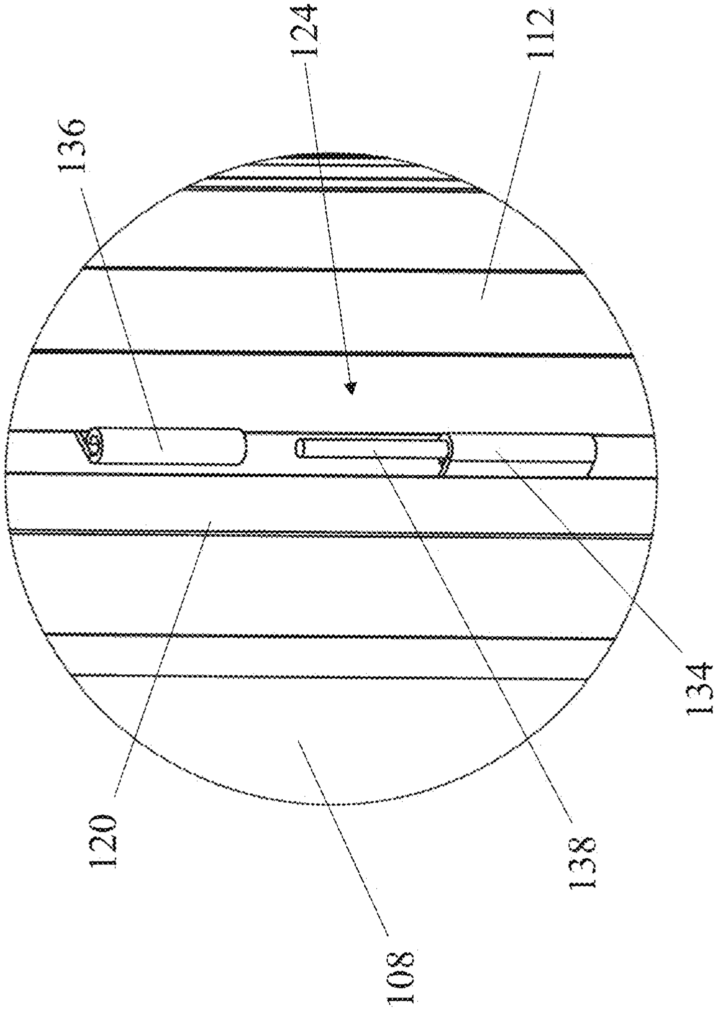
FIG. 7B is a close-up view taken from circle 7B in FIG. 7A.

FIGS. 7A-7B illustrate the function of the plurality of slip hinges 124. Each slip hinge 124 comprises a base 134 and a tube 136. The base 134 has a prong 138 which extends upward from the base 134. The prong 138 is sized to fit inside of the tube 136. For each slip hinge 124 of the plurality of slip hinges 124, the base 134 is fixedly coupled to the mounting frame 120 and the tube 136 is fixed coupled to the secondary door 112. The secondary door 112 may then be hingedly coupled to the mounting frame 120 by lowering the plurality of tubes 136 onto the prongs 138 of the plurality of bases 134. The use of the slip hinge 124 for the combination door unit 100 allows the secondary door 112 to be easily removed when the secondary door 112 is open because the secondary door 112 can be lifted up, but limits the removal of the secondary door 112 when the secondary door 112 is closed.

Figure 8:
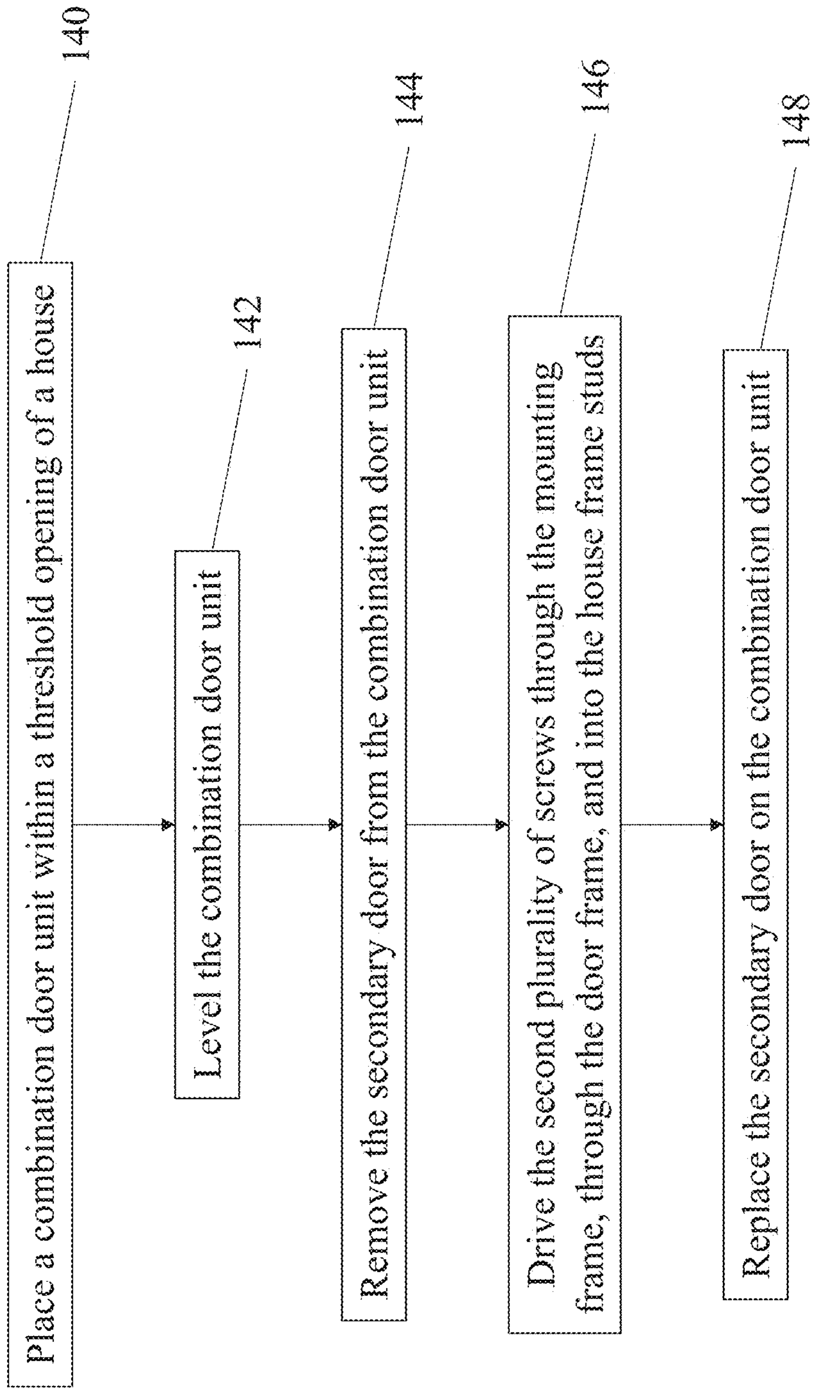
FIG. 8 is a process flow chart showing the steps of installing the combination door unit shown in FIG. 3 into a threshold of a house.
Figure 9A:
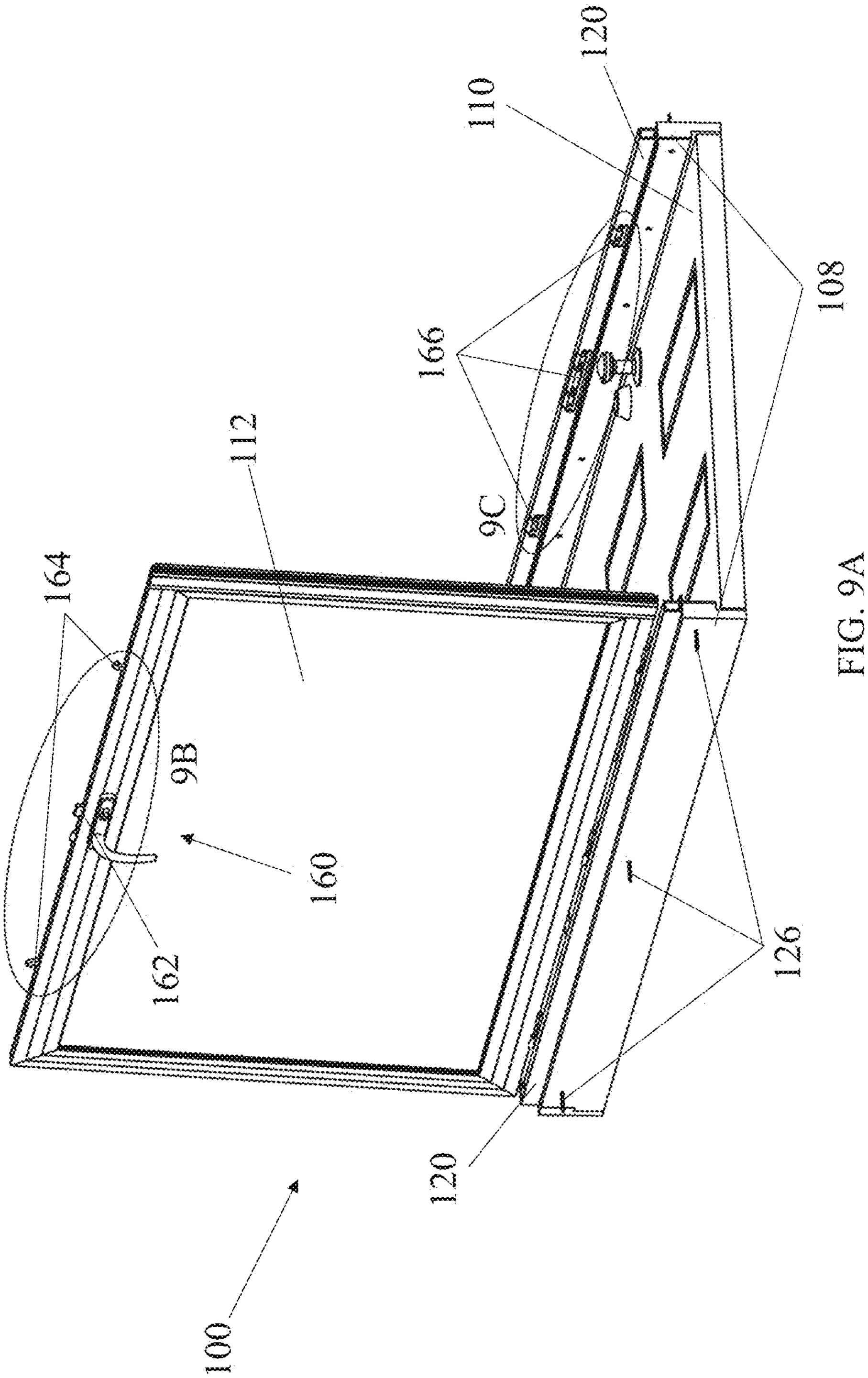
FIG. 9A is a bottom perspective view of the combination door unit shown in FIG. 3 with the secondary door opened to show the three-point lock system.
Figure 9B:
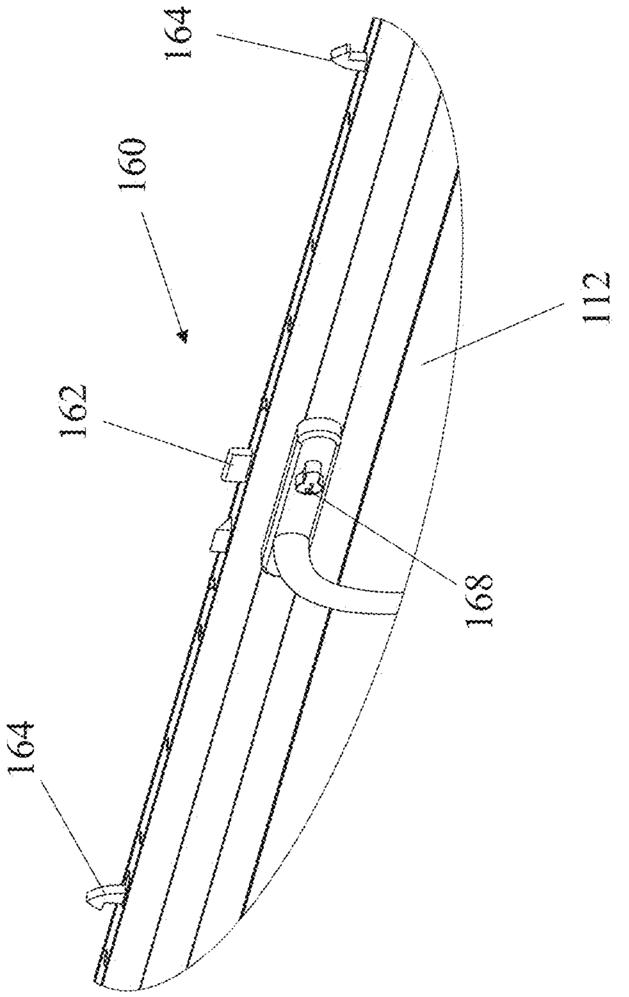
FIG. 9B is a close-up view taken from circle 9B in FIG. 9A.
Figure 9C:
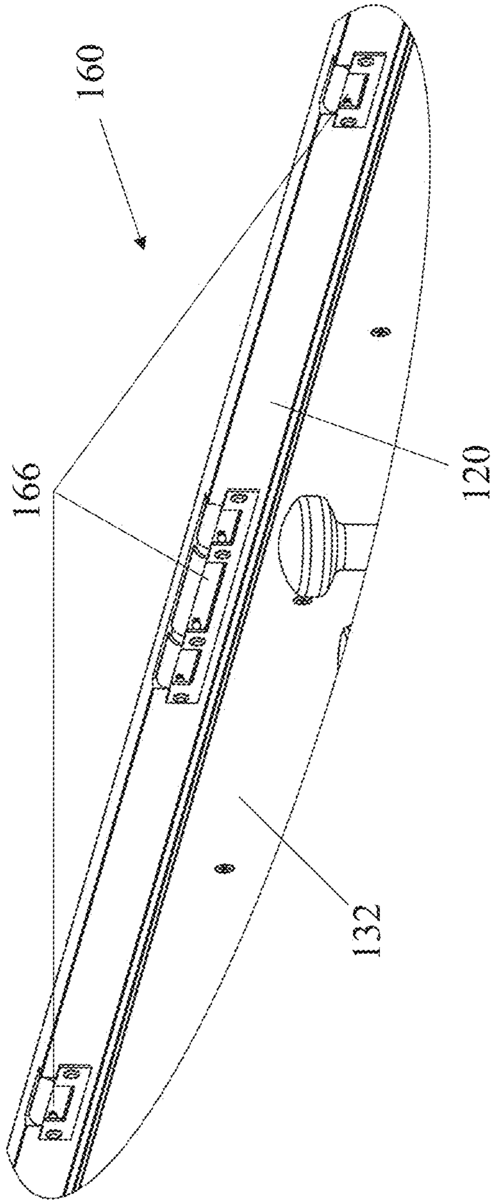
FIG. 9C is a close-up view taken from circle 9C in FIG. 9A.
Figure 10A:
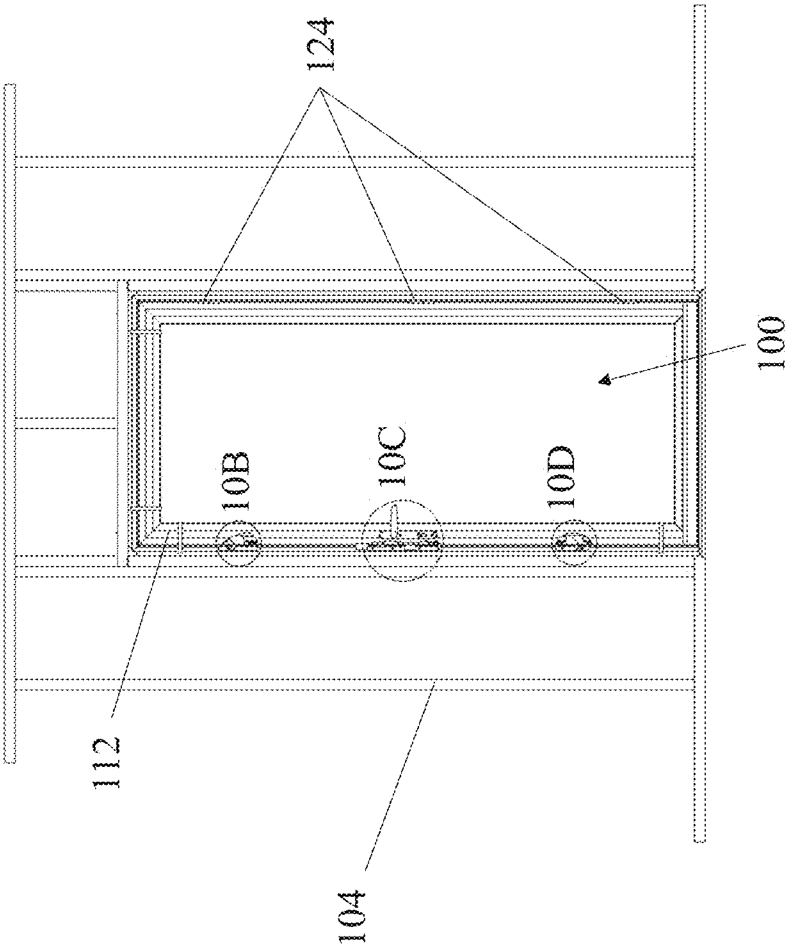
FIG. 10A is a front view of the combination door unit shown in FIG. 3 with the three-point lock system in the locked position.
Figure 10D:
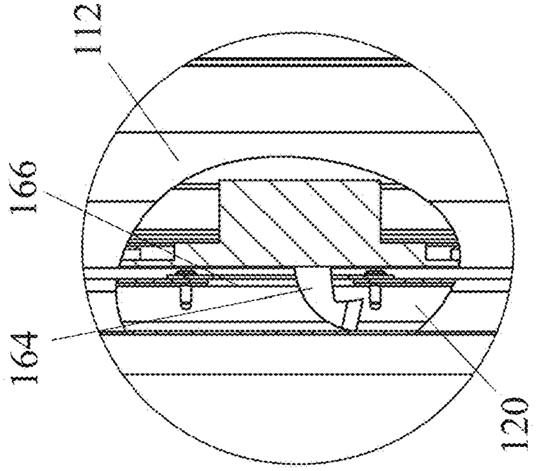
FIG. 10D is a close-up view taken from circle 10D in FIG. 10A.
Figure 10C:
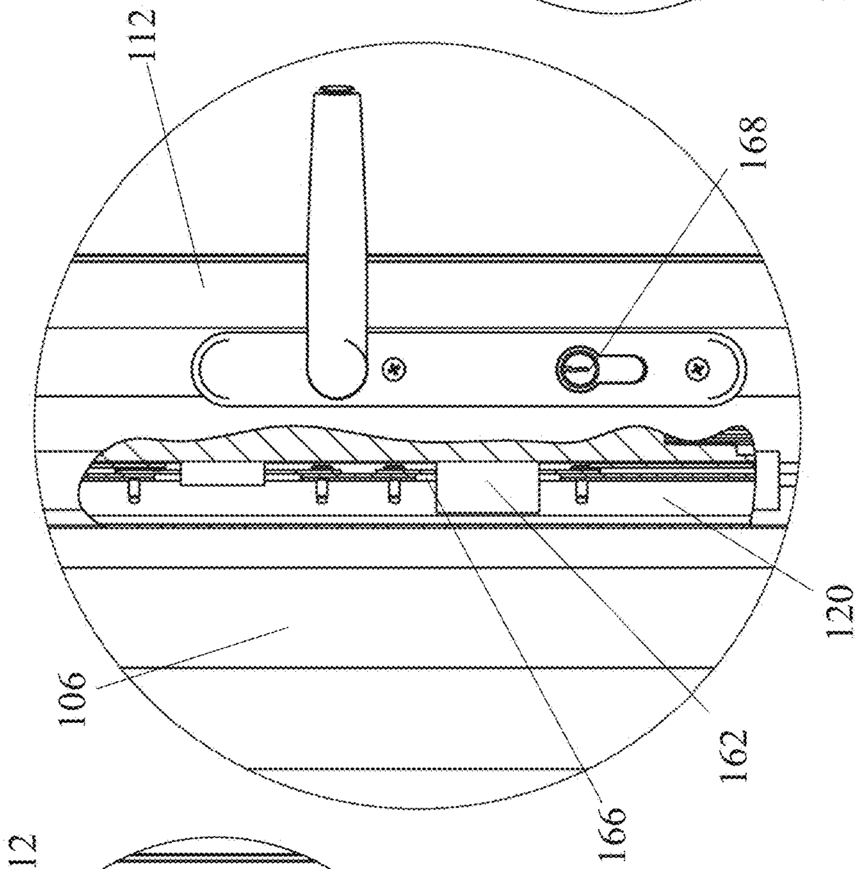
FIG. 10C is a close-up view taken from circle 10C in FIG. 10A.
Figure 10B:
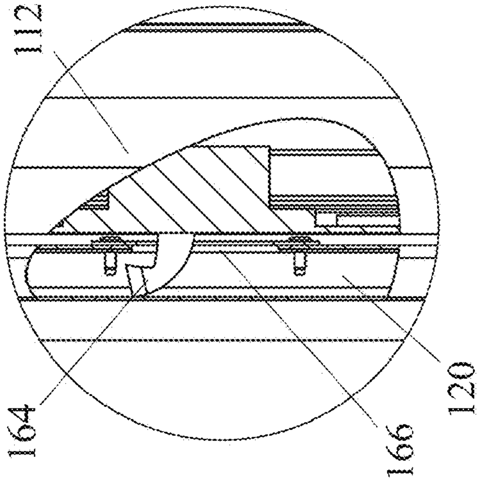
FIG. 10B is a close-up view taken from circle 10B in FIG. 10A.
Figure 11A:
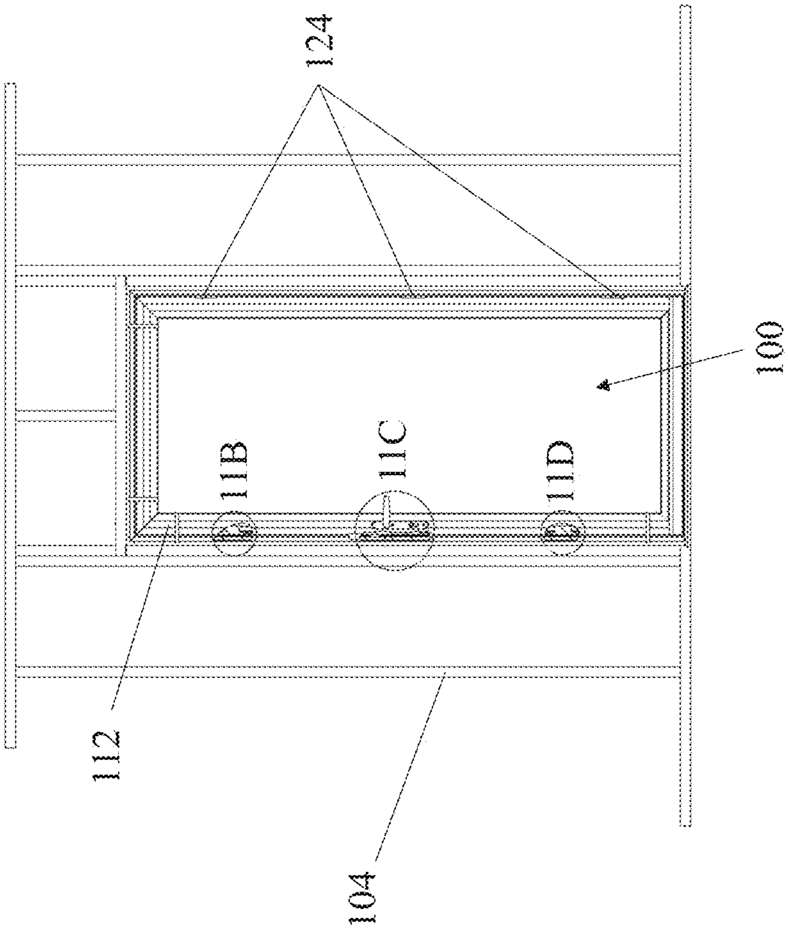
FIG. 11A is a front view of the combination door unit shown in FIG. 3 with the three-point lock system in the unlocked position.
Figure 11B:
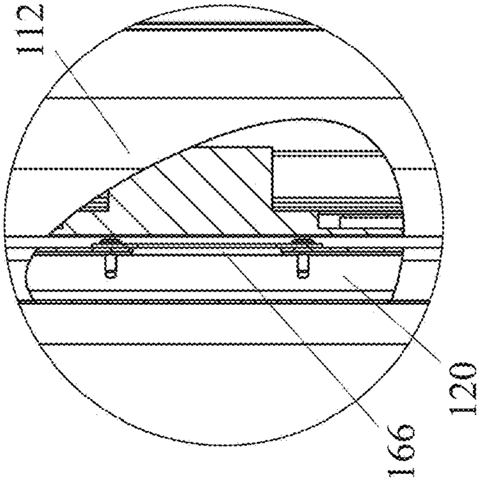
FIG. 11B is a close-up view taken from circle 11B in FIG. 11A.
Figure 11C:
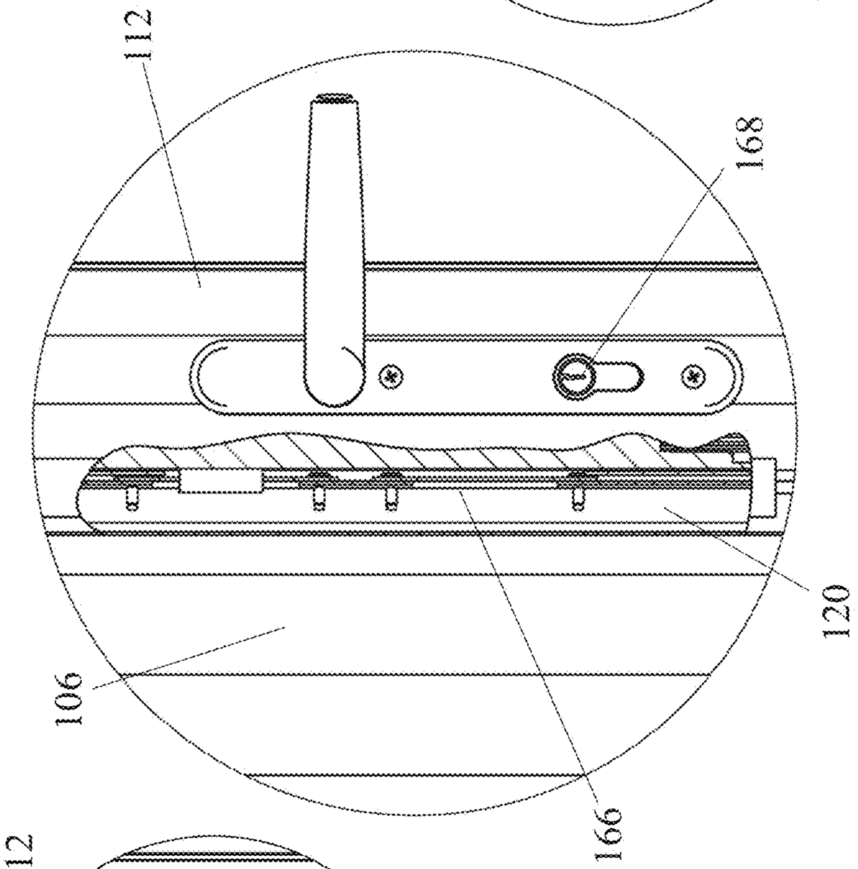
FIG. 11C is a close-up view taken from circle 11C in FIG. 11A.
Figure 11D:
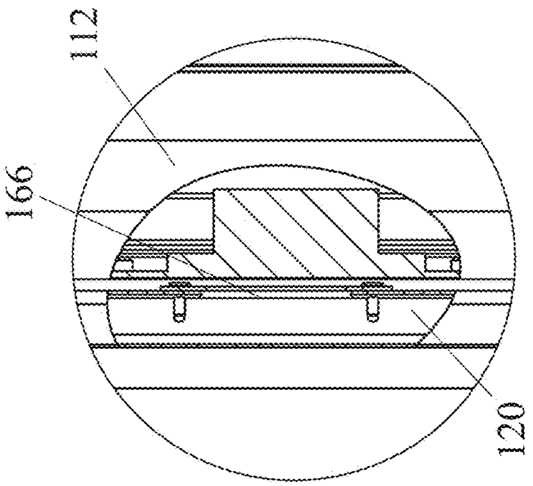
FIG. 11D is a close-up view taken from circle 11D in FIG. 11A.

As illustrated in FIG. 8, a method of installing a combination door unit 100 into a threshold 102 of a house may comprise a first step 140 of placing the combination door unit 100 within the threshold opening 102, a second step 142 of leveling the combination door unit, a third step 144 of removing the secondary door 112 from the combination door unit 100, a fourth step 146 of driving the second plurality of fasteners 126 through the mounting frame 120, through the door frame 108, and into the house frame studs 106, and a fifth step 148 of replacing the secondary door 112 on the combination door unit 100. Some of these steps may be excluded while still successfully installing the combination door unit 100. For example, another method of installing the combination door unit 100 may exclude the second step 142, the third step 144, and the fifth step 148. In such a method, the combination door unit 100 is simply placed within the threshold opening 102 and the second plurality of fasteners 126 is then driven through the mounting frame 120, through the door frame 108, and into the house frame studs 106.

The second step 142 of leveling the combination door unit 100 may comprise inserting a plurality of shims 150 (see FIG. 2) between the plurality of house frame studs 106 and the combination door unit 100. The third step 144 of removing the secondary door 112 from the combination door unit 100 may comprise lifting each tube 136 of the plurality of slip hinges 124 off of the corresponding base 134 of the plurality of slip hinges 124. The fourth step 146 of driving the second plurality of fasteners 126 through the mounting frame 120 may comprise driving the second plurality of fasteners 126 through the mounting flanges 132 of the mounting frame 120. The fourth step 146 may comprise driving a first portion 152 of the second plurality of fasteners 126 through the first jamb 118, driving a second portion 154 of the second plurality of fasteners 126 through a second jamb 156 of the two jambs 114, and driving a third portion 158 of the second plurality of fasteners 126 through the head 116 of the door frame 108 (see FIG. 5). The fifth step 148 of replacing the secondary door 112 on the combination door unit 100 may comprise placing each tube 136 of the plurality of slip hinges 124 onto the corresponding base 134 of the plurality of slip hinges.

The combination door unit 100 may be configured to include a multi-point lock system 160, as illustrated in FIGS. 9A-11D. Some embodiments of the multi-point lock system 160 have a central throw 162 and at least two hooks 164, as shown in FIG. 9B. Corresponding cavities 166 may be milled into the mounting frame 120, as shown in FIG. 9C. The cavities 166 are configured to receive the central throw 162 and the at least two hooks 164. The central throw 162 and the at least two hooks 164 may all be operatively coupled to one key hole 168. When the key hole 168 is turned to a locked position, as shown in FIGS. 10A-10D, the central throw 162 and the at least two hooks 164 all extend out of the secondary door 112 and into the cavities 166, thus locking the secondary door 120. When the key hole 168 is turned to an unlocked position, as shown in FIG. 11A-11D, the central throw 162 and the at least two hooks 164 all retract into the secondary door 112.

It will be understood that implementations of a combination door unit are not limited to the specific assemblies, devices and components disclosed in this document, as virtually any assemblies, devices and components consistent with the intended operation of a combination door unit may be used. Accordingly, for example, although particular combination door units, and other assemblies, devices and components are disclosed, such may include any shape, size, style, type, model, version, class, measurement, concentration, material, weight, quantity, and/or the like consistent with the intended operation of combination door units. Implementations are not limited to uses of any specific assemblies, devices and components; provided that the assemblies, devices and components selected are consistent with the intended operation of a combination door unit.

Accordingly, the components defining any combination door unit implementations may be formed of any of many different types of materials or combinations thereof that can readily be formed into shaped objects provided that the components selected are consistent with the intended operation of a combination door unit implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various combination door units may be manufactured using conventional procedures as added to and improved upon through the procedures described here. Some components defining a combination door unit may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling combination door units are not limited to the specific order of steps as disclosed in this document. Any steps or sequence of steps of the assembly of a combination door unit indicated herein are given as examples of possible steps or sequence of steps and not as limitations, since various assembly processes and sequences of steps may be used to assemble combination door units.

The implementations of a combination door unit described are by way of example or explanation and not by way of limitation. Rather, any description relating to the foregoing is for the exemplary purposes of this disclosure, and implementations may also be used with similar results for a variety of other applications employing a combination door unit.

What is claimed is:

1. A method of installing a combination door unit within a threshold opening of a house, the method comprising:
- placing a preassembled combination door unit within a threshold opening of a house, the combination door unit comprising a door frame having at least two parallel jambs and a head extending between the two parallel jambs, a threshold door hingedly coupled to the door frame, components of a mounting frame formed separate from the door frame and fixedly coupled to the at least two parallel jambs, and a secondary door;
- securing the combination door unit within the threshold opening of the house; and
- after securing the combination door unit, installing the secondary door on the combination door unit.

2. The method of claim 1, wherein installing the secondary door on the combination door unit comprises pivotally coupling the secondary door to the mounting frame.

3. The method of claim 2, wherein pivotally coupling the secondary door to the mounting frame comprises inserting at least two pins into at least two corresponding receivers.

4. The method of claim 1, wherein installing the secondary door on the combination door unit comprises inserting at least two pins into at least two corresponding receivers.

5. The method of claim 1, further comprising leveling the combination door unit by inserting a plurality of shims around the combination door unit.

6. The method of claim 1, further comprising driving a plurality of fasteners through the mounting frame and the door frame.

7. The method of claim 1, wherein the secondary door is configured to be removable from the combination door unit when the secondary door is in an open position.

8. A combination door unit assembly for a threshold opening of a house, comprising:
- a combination door unit configured to be installed within a threshold opening of a house as a preassembled unit, the combination door unit comprising:
  - a door frame configured to couple with the threshold opening of the house;
  - a threshold door hingedly coupled to the door frame; and
  - a secondary door mounting frame on the door frame; and
- a secondary door adapted to pivotally couple to the combination door unit through a plurality of pins sliding into a plurality of corresponding receivers to couple the secondary door to the combination door unit through the secondary door mounting frame, the secondary door mounting frame configured to overlap at least three sides of the secondary door when the secondary door is pivoted to a closed position.

9. The combination door unit of claim 8, wherein the secondary door mounting frame is coupled to the door frame through a plurality of screws.

10. The combination door unit of claim 8, wherein the secondary door is configured to be removable from the combination door unit when the secondary door is in an open position.

11. The combination door unit of claim 8, wherein the secondary door mounting frame having at least three sides, wherein each of the at least three sides of the mounting frame is formed separate from the door frame and coupled to a corresponding part of the door frame.

12. The combination door unit of claim 8, wherein the secondary door mounting frame having at least three sides, wherein each of the three sides of the mounting frame is formed separate from the door frame and separately coupled to a corresponding part of the door frame.

13. The combination door unit of claim 8, wherein the secondary door is configured to pivotally couple to the combination door unit through inserting a plurality of pins into a plurality of corresponding receivers.

14. The combination door unit of claim 8, wherein the secondary door mounting frame exists on the door frame through coupling at least two parallel jambs and a head to parts of the door frame.

15. A method of installing a combination door unit within a threshold opening of a house, the method comprising:
- placing a preassembled combination door unit within a threshold opening of a house, the combination door unit comprising a door frame with a secondary door mounting frame on the door frame, and a threshold door hingedly coupled to the door frame;
- securing the combination door unit within the threshold opening of the house; and
- after securing the combination door unit, installing a secondary door on the secondary door mounting frame of the combination door unit.

16. The method of claim 15, wherein the secondary door mounting frame exists on the door frame through coupling at least two parallel jambs and a head to corresponding parts of the door frame.

17. The method of claim 15, wherein installing the secondary door on the combination door unit comprises pivotally coupling the secondary door to the mounting frame.

18. The method of claim 17, wherein pivotally coupling the secondary door to the mounting frame comprises inserting at least two pins into at least two corresponding receivers.

19. The method of claim 17, wherein pivotally coupling the secondary door to the mounting frame comprises inserting a plurality of pins into a plurality of corresponding receivers.

20. The method of claim 15, further comprising driving a plurality of fasteners through the mounting frame and the door frame.

* * * * *